(12) United States Patent
Park

(10) Patent No.: US 6,850,149 B2
(45) Date of Patent: *Feb. 1, 2005

(54) NETWORK CONTROL METHOD AND APPARATUS FOR HOME APPLIANCE

(75) Inventor: Joon Hyung Park, Seoul (KR)

(73) Assignee: LG Electronics Inc., Seoul (KR)

( * ) Notice: Subject to any disclaimer, the term of this patent is extended or adjusted under 35 U.S.C. 154(b) by 415 days.

This patent is subject to a terminal disclaimer.

(21) Appl. No.: 09/929,101

(22) Filed: Aug. 15, 2001

(65) Prior Publication Data

US 2002/0063633 A1 May 30, 2002

(30) Foreign Application Priority Data

Nov. 27, 2000 (KR) ........................................ 2000-70988

(51) Int. Cl.$^7$ ............................. G08B 5/22; H04Q 1/30; G08C 19/00
(52) U.S. Cl. ................... 340/7.1; 340/825.69; 455/420; 345/327
(58) Field of Search ................................ 340/7.1, 7.21, 340/7.24, 7.29, 7.3, 7.31, 825.69, 825.72; 455/420, 557, 573; 345/326, 327; 379/102.1

(56) References Cited

U.S. PATENT DOCUMENTS

| | | | | |
|---|---|---|---|---|
| 5,802,467 A | * | 9/1998 | Salazar et al. | 455/420 |
| 5,875,395 A | * | 2/1999 | Holmes | 455/420 |
| 6,020,881 A | * | 2/2000 | Naughton et al. | 345/740 |
| 6,021,324 A | * | 2/2000 | Sizer et al. | 455/403 |
| 6,061,604 A | * | 5/2000 | Russ et al. | 700/90 |
| 6,157,313 A | * | 12/2000 | Emmermann | 340/5.42 |
| 6,192,236 B1 | * | 2/2001 | Irvin | 455/420 |
| 6,252,883 B1 | * | 6/2001 | Schweickart et al. | 370/441 |
| 6,308,083 B2 | * | 10/2001 | King | 455/556.1 |
| 6,480,586 B1 | * | 11/2002 | Hayes et al. | 379/102.02 |
| 6,496,575 B1 | * | 12/2002 | Vasell et al. | 379/102.05 |
| 6,564,056 B1 | * | 5/2003 | Fitzgerald | 340/5.1 |
| 6,580,950 B1 | * | 6/2003 | Johnson et al. | 700/17 |
| 6,615,088 B1 | * | 9/2003 | Myer et al. | 700/20 |

FOREIGN PATENT DOCUMENTS

| | | |
|---|---|---|
| JP | 07-131542 A | 5/1995 |
| JP | 10-164246 A | 6/1998 |
| JP | 11-088965 A | 3/1999 |
| JP | 11-187134 A | 7/1999 |
| JP | 11-232193 A | 8/1999 |

* cited by examiner

Primary Examiner—Michael Horabik
Assistant Examiner—Nam Nguyen
(74) Attorney, Agent, or Firm—Birch, Stewart, Kolasch & Birch, LLP

(57) ABSTRACT

An apparatus and method for controlling a home appliance network is disclosed, in which a home server is established at low cost so that an external user can easily control the operation of home appliances within home. The apparatus for controlling a home appliance network having at least one or more home appliances includes an external communication means for inputting a predetermined operation control command to control the operation of the home appliances by externally accessing a home page of a corresponding communication service provider through an Internet, a radio communication network for transmitting the operation control command input to the home page through the external communication means in a radio type, and an internal communication means located within home, for controlling the operation of the corresponding home appliance of the home appliance network to correspond to the operation control command transmitted in a radio type through the radio communication network.

10 Claims, 5 Drawing Sheets

NETWORK CONTROL METHOD AND APPARATUS FOR HOME APPLIANCE

BACKGROUND OF THE INVENTION

1. Field of the Invention

The present invention relates to a home appliance network, and more particularly, to an apparatus and method for controlling a home appliance network.

2. Background of the Related Art

Currently, a home appliance network is implemented in such a manner that a home server such as a personal computer (PC) and a set top box is established within each home and is provided with a unique IP address through a communication network such as LAN or cable telephone network. External users are accessed to the home server of the home appliance network through tie communication network so that they can remotely control the operation of a desired home appliance.

A related art home appliance network will be described with reference to the accompanying drawings.

FIG. 1 illustrates a related art home appliance network. As shown in FIG. 1, the related art home appliance network includes an external communication equipment 10, a home server 40, an Internet 20, and a cable communication network 30. The external communication equipment 10 externally controls the operation of home appliances 50 within home. The home server 40 controls the operation of the home appliances 50 in accordance with an operational control signal of the external communication equipment 10. The cable communication network 30 transmits the operational control signal of the external communication equipment 10 from the Internet 20 to the home server 40.

The operation of the aforementioned related art home appliance network will now be described with reference to FIG. 1.

An apparatus established as the home server 40 of the home appliance network, such as a PC or a set top box, is connected with the Internet 20 and then is in standby state to receive information transmitted to the home server 40.

The home server 40 includes a sub network that can transmit and receive signals to and from the home appliances 50. Also, the home server 40 should be provided with a program that can establish a server environment.

Meanwhile, a user externally accesses the Internet 20 through a PC or other communication terminal unit 10 connected with the cable communication network 30 such as LAN or telephone communication network. Then, the user moves to a home page for access to the home server 40 within home on the Internet 20.

Once the user accesses the home server 40 having a unique IP address in a corresponding home page, a signal to control the operation of the home appliances 50 within home is output to the home server 40.

The home server 40 receives the operation control signal of the corresponding home appliance 50 through the cable communication network 30 in accordance with a user's request in a home page on the Internet 20. Then, the home server 40 outputs the operation control signal of the corresponding home appliance 50 among the home appliances included in a subnet in the home server 40 in accordance with the received control signal.

The home server 40 and the home appliances 50 transmit and receive data through a protocol prescribed by a data transceiver system.

Meanwhile, the home appliances 50 included in the subnet and connected with the home server 40 perform the operation corresponding to the operation control signal in accordance with the output operation control signal and outputs data on their operation state to the home server 40.

The home server 40 outputs the data on the operation state of the home appliances 50 to an external user.

The related art home appliance network has several problems.

First, if the home server uses a communication system such as ADSL, the home server has a variable IP not a fixed IP. In this case, it is difficult for the external user to easily search the IP address of the home server and access the home server. Furthermore, to establish the home server, the user should purchase a PC or other equipment and is required to subscribe to a charged cable network that can access a communication network. Accordingly, the required cost increases.

SUMMARY OF THE INVENTION

Accordingly, the present invention is directed to an apparatus and method for controlling a home appliance network that substantially obviates one or more problems due to limitations and disadvantages of the related art.

An object of the present invention is to provide an apparatus and method for controlling a home appliance network in which a home server is established at low cost so that an external user can easily control the operation of home appliances within home.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a home appliance network having at least one or more home appliances includes an external communication means for inputting a predetermined operation control command to control the operation of the home appliances by externally accessing a home page of a corresponding communication service provider through an Internet, a radio communication network for transmitting the operation control command input to the home page through the external communication means in a radio type, and an internal communication means located within home, for controlling the operation of the corresponding home appliance of the home appliance network to correspond to the operation control command transmitted in a radio type through the radio communication network.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
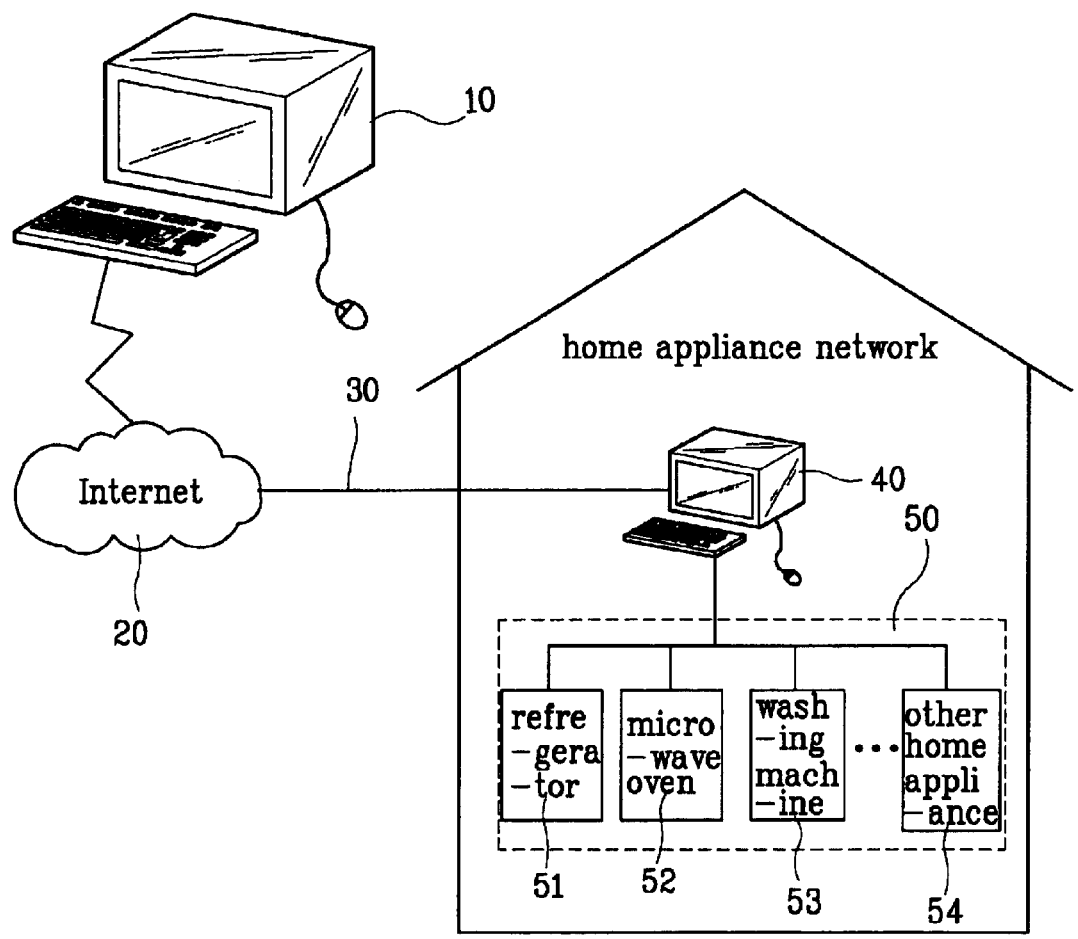
FIG. 1 is a block diagram illustrating a related art home appliance network.
Figure 2:
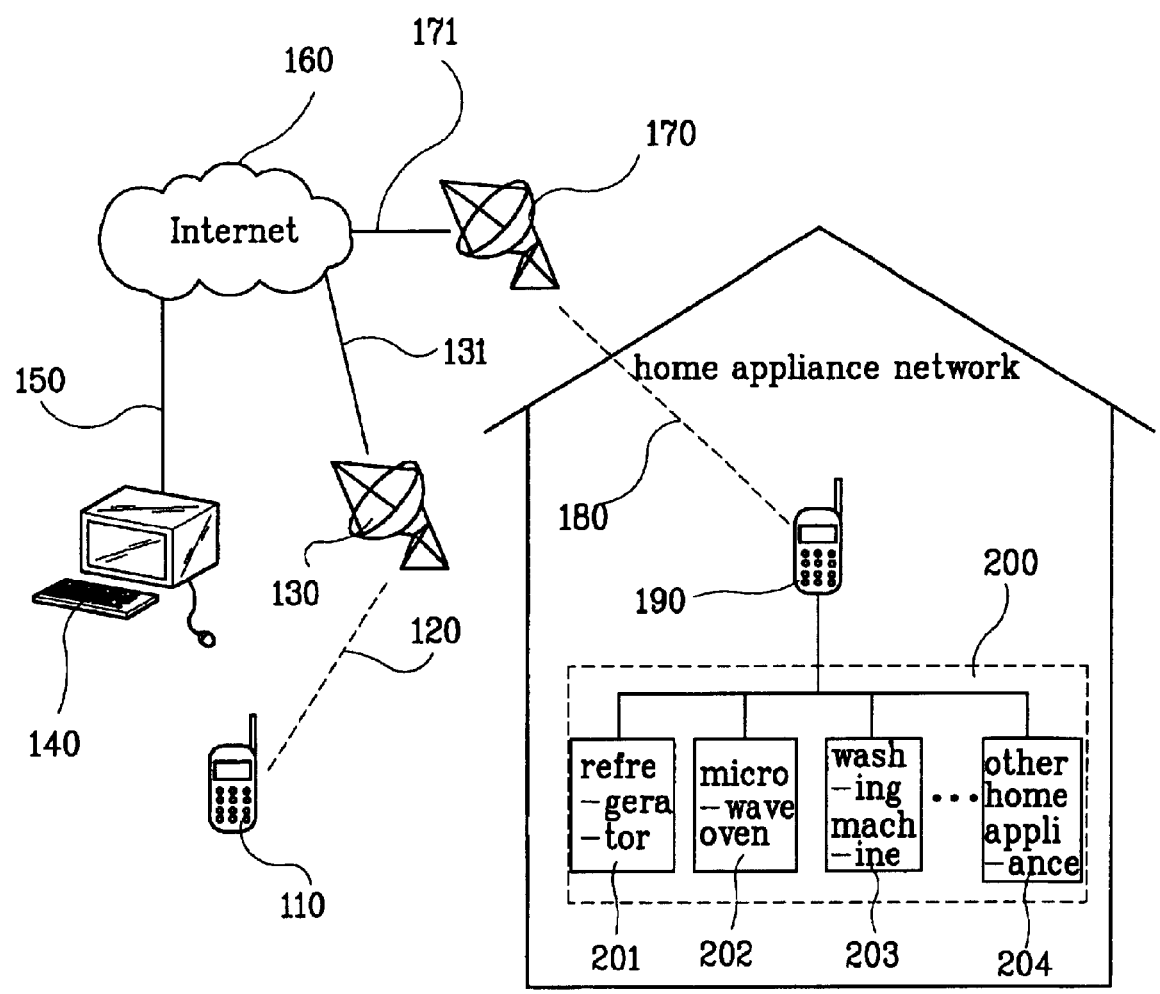
FIG. 2 is a block diagram illustrating an apparatus for controlling a home appliance network according to the present invention.

As shown in FIG. 2, an apparatus for controlling a home appliance network according to the present invention includes external communication equipments 110 and 140 for inputting a predetermined operation control command to control the operation of home appliances 200 within home by externally accessing a home page of a corresponding communication service provider through an Internet, a radio communication network 120 for transmitting the operation control command input to the home page through the external communication equipments 110 and 140 in a radio type, and an internal communication equipment 190 located within home, for controlling the operation of a corresponding home appliance of the home appliance network to correspond to the operation control command transmitted in a radio type through the radio communication network 120.

A method for controlling the home appliance network according to the present invention will be described with reference to the accompanying drawings.

First Embodiment

Figure 3:
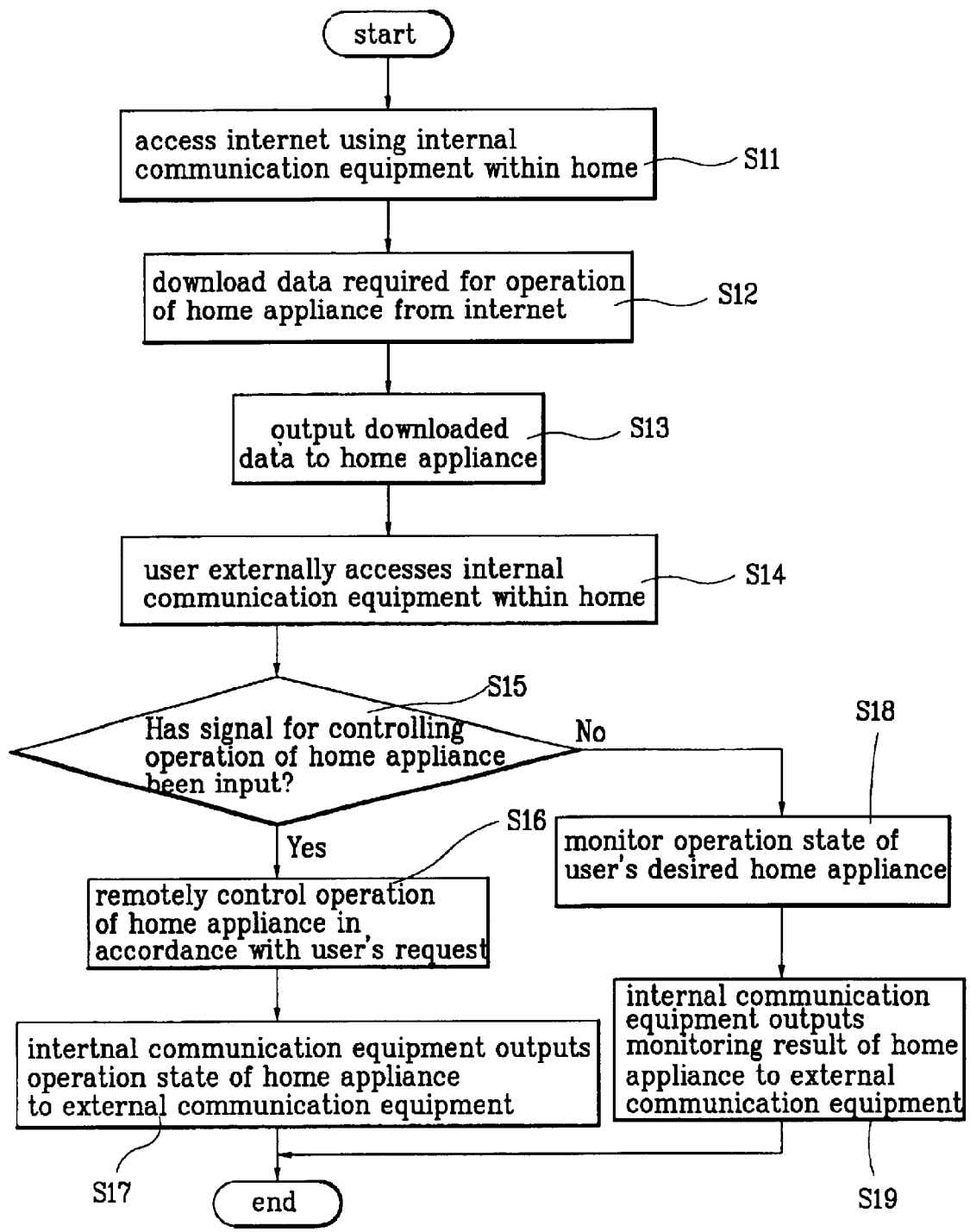
FIG. 3 is a flow char illustrating a method for controlling a home appliance network according to the first embodiment of the present invention.

As shown in FIG. 3, in a home appliance network within home, an internal communication equipment 190, e.g., a portable communication terminal unit is established as a home server. Then, a user accesses an Internet 160 provided by a communication service provider through the portable communication terminal unit (S11), so that data required for the operation of home appliances 200 within home or other control are searched through the Internet 160 and then downloaded (S12).

The internal communication equipment 190 outputs the downloaded data to corresponding home appliances 200 (S13).

Meanwhile, the home server 190 and the home appliances 200 transmit and receive data through a protocol prescribed by a data transceiver system not through IP addresses.

The corresponding home appliances 200 receive and store corresponding data, and then perform the operation of the stored data in accordance with an external control signal.

Therefore, the data of the operation or the other control operation are input to the home appliances 200 included in a subnet and connected with the home server, i.e., the internal communication equipment 190. An environment that can control the operation of the corresponding home appliance 200 in accordance with a control signal of the internal communication equipment 190 is established.

Once the home appliance network within home is established, the home appliance network can be managed in accordance with the control operation of an external user or an internal user within home.

Subsequently, if an environment that can receive an external signal is set up, the external user accesses the internal communication equipment 190 through an external communication equipment such as a radio communication equipment 110 (e.g., portable communication terminal unit) and cable communication terminal units 140 (e.g., PC) connected with LAN or other cable network (S14).

To access the internal communication equipment using the external communication equipment, the user accesses a home page of the communication service provider using the radio communication equipment 110 or the cable communication terminal unit 140 and inputs a telephone number of the internal communication equipment 190 within home in the home page. The radio communication equipment 110 is connected with the Internet 160 through the radio communication network 120 and the cable communication network 131 provided by the communication service provider. The cable communication terminal unit 140 is connected with the Internet 160 through the cable communication network 131.

Once the user accesses the internal communication equipment 190 using the radio communication equipment 110 and the cable communication equipment 140 connected with the external network, the user controls the operation of a desired home appliance 200 or implements a menu to check the operation state of the desired home appliance 200. A control signal for implementing the menu is output to the home server, i.e., the internal communication equipment 190 within home through the radio communication network 180 on the Internet 160.

Subsequently, the internal communication equipment 190 determines whether a signal for controlling the operation of the corresponding home appliance is input through the radio communication network 180 on the Internet 160 (S15). Once the signal for controlling the operation of the corresponding home appliance is input, the internal communication equipment 190 outputs a remote control signal for operating the corresponding home appliance according to the operation control signal in a desired state to the corresponding home appliance (S16). If the input signal is not for controlling the operation of the corresponding home appliance, the input signal is determined as a monitoring signal for checking the current operation state of the corresponding home appliance so that the monitoring signal is output to the corresponding home appliance (S17).

Once the corresponding home appliance 200 is remotely controlled, i.e., is operated by the operation control signal, the corresponding home appliance 200 continues to output the current operation state to the internal communication equipment 190 in accordance with the operation control signal. If the monitoring signal is input to the corresponding home appliance 200, the corresponding home appliance 200 outputs the current operation state to the internal communication equipment 190.

Meanwhile, the internal communication equipment 190 outputs the operation state according to the remote control of the corresponding home appliance 200 or the current monitoring result of the corresponding home appliance 200 to the external communication equipment through the radio communication network 180 and the Internet 160 (S18).

Afterwards, the user checks the monitoring result of the home appliance 200 or the operation state according to the operation control, and determines whether to control the next operation.

Figure 4:
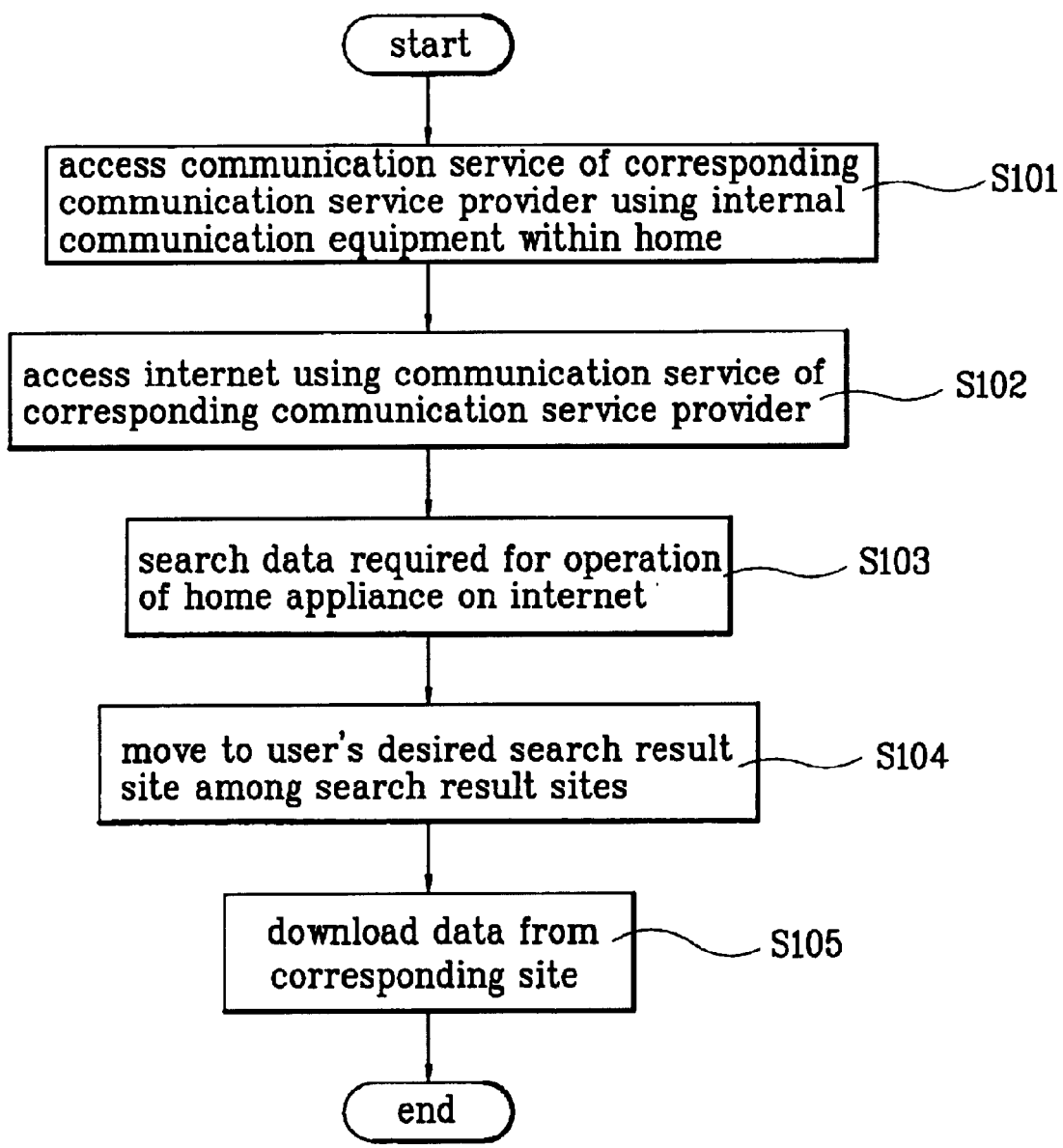
FIG. 4 is a flow chart illustrating a method for downloading data of an internal communication equipment according to the present invention.

In the aforementioned home appliance network, a method for searching data required for the operation of the home appliance and downloading the data will now be described in detail with reference to FIG. 4.

First, the user connects the internal communication equipment 190 subscribed to a communication service of a communication service provider with the communication service of a corresponding communication service provider (S101).

Once the internal communication equipment 190 is connected with the corresponding communication service, the user accesses the Internet 160 through the communication service so as to establish an environment that can search for data (S102).

Then, the internal communication equipment 190 can use the Internet 160 and a search window is displayed in the internal communication equipment. The user inputs a search word of data required to operate the home appliance in the search window so that sites of the search results of the data are searched (S103).

Subsequently, the user selects a desired site among the sites according to the search results of the data and moves to the desired site (S104). Then, the user downloads desired data from the corresponding site (S105).

Second Embodiment

Figure 5:
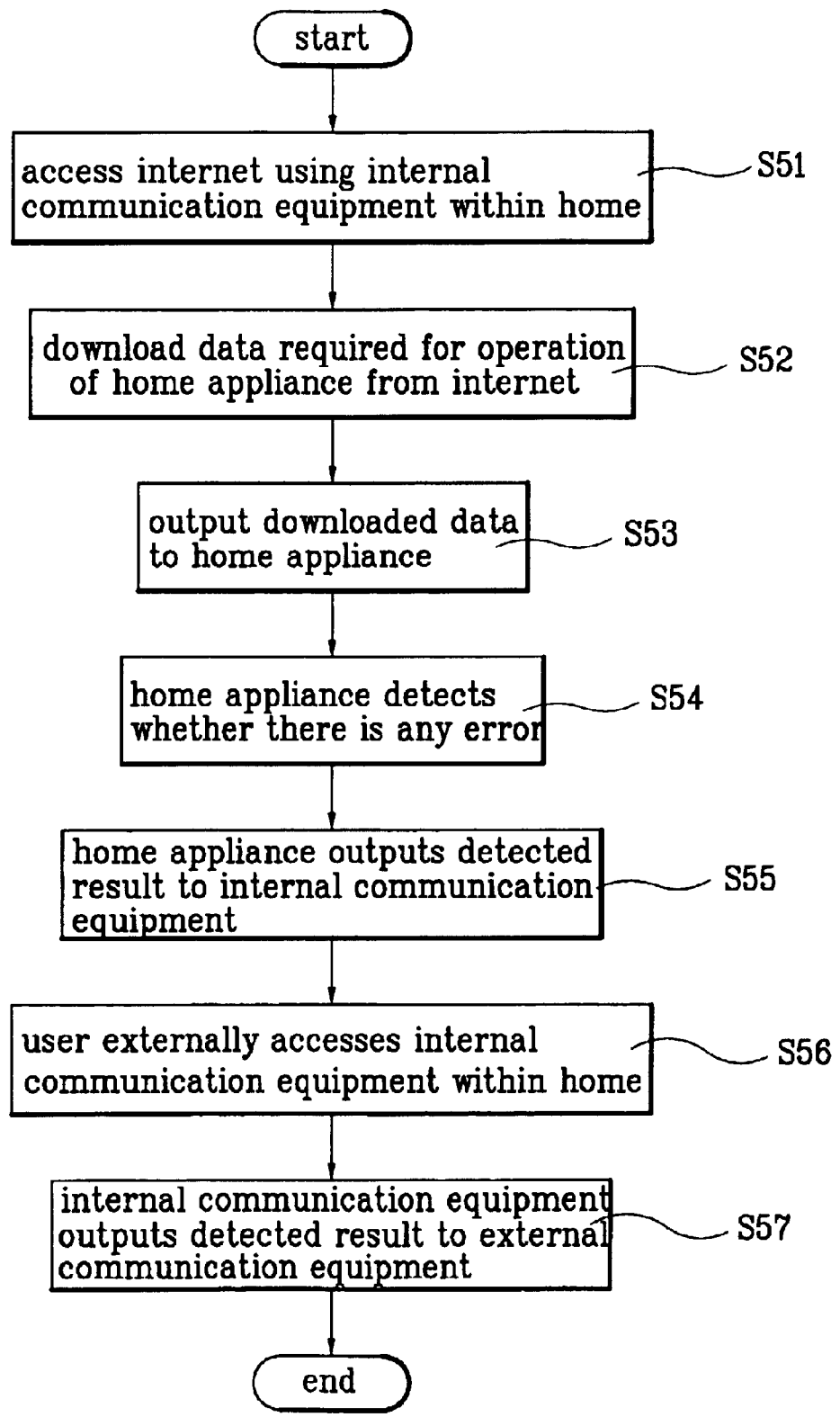
FIG. 5 is a flow chart illustrating a method for controlling a home appliance network according to the second embodiment of the present invention.

As shown in FIG. 5, in a home appliance network within home, an internal communication equipment 190, e.g., a portable communication terminal unit is established as a home server. Then, a user accesses an Internet 160 using the internal communication equipment 190 (S51), so that data required for the operation of home appliances 200 within home or other control are searched through the Internet 160 and then downloaded (S52).

The internal communication equipment 190 outputs the downloaded data to corresponding home appliances 200 (S53).

Meanwhile, the home server 190 and the home appliances 200 transmit and receive data through a protocol prescribed by a data transceiver system not through IP addresses.

The corresponding home appliances 200 receive and store corresponding data, and then perform the operation of the stored data in accordance with an external control signal.

Therefore, the data of the operation or the other control operation are input to the home appliances 200 included in a subnet and connected with the home server, i.e., the internal communication equipment 190. An environment that can control the operation of the corresponding home appliance 200 in accordance with a control signal of the internal communication equipment 190 is established. Thus, the home appliance network within home is set up.

Once the home appliance network within home is set up, the home appliance network can be managed in accordance with the control operation of an external user or an internal user within home.

Meanwhile, once the data are input to the home appliance within home to set up the home appliance network, the home appliance has an additional function of determining whether there is any error such as failure and searching the error. Also, since the data can be input and output through the protocol, the home appliance detects whether there is any error (S54). If it is detected whether there is any error, the home appliance outputs the detected result to the internal communication equipment (S55).

Subsequently, if an environment that can receive an external signal is set up, the external user accesses the internal communication equipment 190 through an external communication equipment such as a radio communication equipment 110 (e.g., a portable communication terminal unit) and cable communication terminal units 140 (e.g., PC) connected with LAN or other cable network (S56). Then, the internal communication equipment 190 outputs the detected result to the user through the external communication equipment regardless of the operation control signal of the user (S57).

Afterwards, the user checks whether the home appliance has any error, through the external communication equipment, and determines whether to control the operation of the corresponding home appliance.

Meanwhile, a method for searching data required for the operation of the home appliance in the home appliance network and downloading the data is identical to the method according to the first embodiment.

As aforementioned, the apparatus and method for controlling a home appliance network has the following advantages.

First, since the radio communication terminal unit is used without a separate home server, the network can be set up at low cost. Also, unlike the communication network using the variable IP address such as ADSL, since the telephone number of the internal communication equipment acts as a fixed IP address, the external user can easily access the home appliance network within home. Further, the internal communication equipment, i.e., the portable communication terminal unit is available for the home appliance network according to a data input and output function in addition to a data transmitting and receiving function.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus for controlling a home appliance network having at least one or more home appliances comprising:
    an external communication means, physically separate from a home including the home appliance network, for accepting an input of an operation control command to control the operation of the home appliances, wherein the external communication means includes a home page of a corresponding communication service provider through an Internet, and the home page receives the operation control command from a user;
    a radio communication network for transmitting the operation control command input to the home page by dialing a cellular phone number and transmitting data representing the operation control command over a cellular network; and
    an internal communication means, located within the home including the home appliance network, the internal communication means answering the dialed cellular phone number, receiving the data representing the operation control command, and transmitting the operation control command to a home appliance of the home appliance network.

2. The apparatus of claim 1, wherein the home page of the external communication means receives the operation control command from at least one of a first external communication equipment accessing the home page through a cable communication network and a second external communication equipment accessing the home page through a radio communication network or the cable communication network.

3. The apparatus of claim 2, wherein the cable communication network includes a telephone communication network or an Internet private communication network.

4. The apparatus of claim 2, wherein the radio communication network is a portable radio communication network.

5. The apparatus of claim 2, wherein the first external communication equipment includes at least one of a PC, a private terminal unit, and a server.

6. The apparatus of claim 2, wherein the second external communication equipment is a portable personal communication terminal unit.

7. The apparatus of claim 1, wherein the internal communication means is a portable personal communication terminal unit.

8. A method for controlling a home appliance network having at least one or more home appliances comprising:

presenting a home page accessible over the Internet, the home page being provided by external communication equipment, physically separate from a home including the home appliance network;

accepting a user's input of an operation control command to control the operation of one or more of the home appliances via the home page;

dialing a cellular telephone number and transmitting data representing the operation control command over a cellular network;

answering the dialed cellular phone number at internal communication equipment, located within the home including the home appliance network;

receiving the data representing the operation control command at the internal communication equipment; and transmitting the operation control command from the internal communication equipment to a home appliance of the home appliance network.

9. The method of claim 8, further comprising the steps of:

monitoring the operation state of the home appliance and providing the operation state to the internal communication equipment; and transmitting the operation state from the internal communication equipment to the external communication equipment through the cellular network.

10. The method of claim 8, further comprising the steps of:

detecting at the home appliance whether there is any error and outputting the detected result to the internal communication equipment; and outputting at the internal communication equipment the detected result to the external communication equipment if the one accesses the other.

* * * * *